Nov. 21, 1933.　　　　E. J. MARKING　　　　1,936,026

GREASE TRAP

Filed May 9, 1932

E. J. Marking,
INVENTOR

BY Victor J. Evans & Co.
ATTORNEY

WITNESS:

Patented Nov. 21, 1933

1,936,026

UNITED STATES PATENT OFFICE 1,936,026

GREASE TRAP

Elmer J. Marking, Louisville, Ky.

Application May 9, 1932. Serial No. 610,244

1 Claim. (Cl. 210—56)

The invention relates to a trap construction and more especially to a grease trap.

The primary object of the invention is the provision of a trap of this character wherein the same may be used anywhere in the waste line from a fixture having grease going through it, the waste line being connected to the inlet of the trap and its size depends entirely upon the size of the waste line and trap employed, the trap being disposed at proper working position corresponding to the line or according to outside or inside condition and will automatically trap grease and will eliminate emission of odors and also will obviate interference from vermin.

Another object of the invention is the provision of a grease trap of this character, wherein the same can be readily and easily installed, it being watertight and will resist rust, it being made of metal it will not crack easily while arranged therein is an oil seal which keeps smell and gases from escaping and will enable the ready and convenient cleaning, the trap being adaptable both outside and inside of a building.

A further object of the invention is the provision of a trap of this character which is extremely simple in construction, thoroughly reliable and efficient in its purposes, strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:—

Similar reference characters indicate corresponding parts throughout the several views in the drawing.

Figure 1:
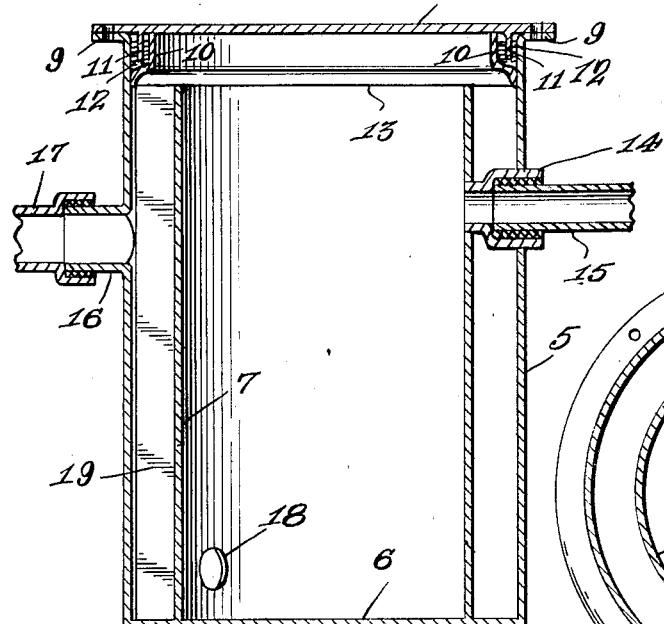
Figure 1 is a vertical longitudinal sectional view through a trap constructed in accordance with the invention.
Figure 3:
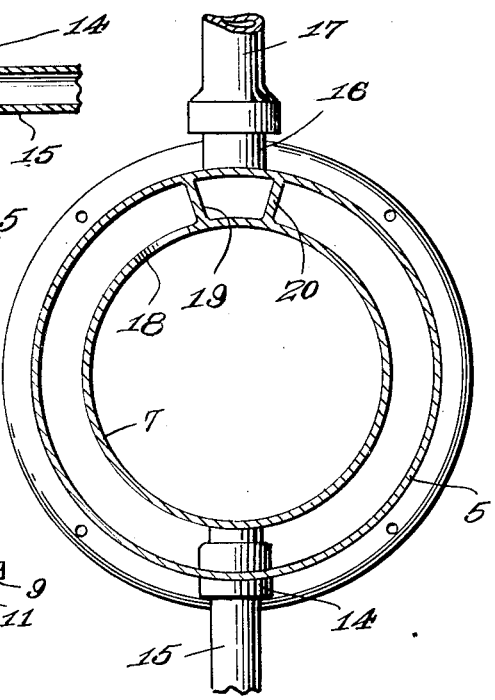
Figure 3 is a sectional view on the line 3—3 of Figure 2 looking in the direction of the arrows.

Referring to the drawing in detail, the grease trap comprises an outer cylindrical body 5 preferably formed from metal, permanently closed at its bottom 6 and open at its top, while formed internally of this body is an inner hollow shell 7 which is joined with the bottom 6 and rises a considerable distance in close proximity to the upper open top or end of said body. The upper open end or top of the body 5 has removably fitted thereon a cover or head 8, the latter being of a size to become superimposed upon an outturned annular flange or rim 9 formed at the upper open end of the body 5.

Figure 2:
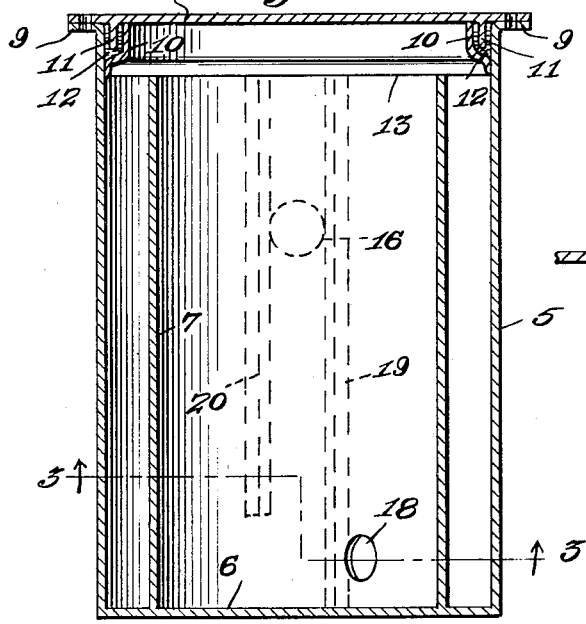
Figure 2 is a similar view taken at right angles to Figure 1.
Figure 4:
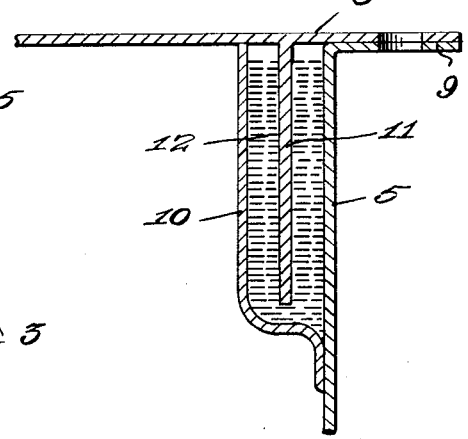
Figure 4 is an enlarged fragmentary vertical sectional view through the oil seal of the trap.

Interiorly of the body 5 at the upper open end thereof is an annular oil sealing trough 10, while formed with the cover or head 8 to depend within the trough is a circular rib 11 and into this trough is introduced oil 12 which functions to effect an oil seal between the body and the cover or head as will be clearly apparent from Figures 1, 2 and 4 of the drawing.

The shell 7 has an open top 13 and formed with the side wall of shell 7 is an inlet coupling or hub 14 which is passed through the side wall of the body 5 and has suitably anchored therein the inlet pipe 15 of the waste line, while formed diametrically opposite this hub 14 on the side wall of the body 5 is an outlet nipple 16 with which is connected the outlet pipe 17 of the drain line of a house system coming from a fixture thereof.

The shell 7 close to the bottom 6 of the body 5 is provided with a port or opening 18 while on opposite sides of the outlet nipple 16 and joined with the body 5 and the shell 7 is a vertical partition 19 and baffle 20. The partition 19 is extended from the bottom of the body 5 to the top 13 of the shell 7, while the baffle extends from the top of the shell 7 to a point close to the bottom 6 of the body 5 as is clearly shown by dotted lines in Figure 2 of the drawing. It is to be understood that the trap in its entirety is usable in the waste line from a fixture having grease going through it, the waste line being connected to the inlet of the trap and when the said trap is placed in the ground the cover or head 8 is to be disposed even with the ground surface, yet the said trap may be hung from a ceiling by placing the top of the body 5 of trap even with floor above or it may be set upon the floor or placed in a basement floor with the top of the body 5 even therewith. The oil seal is designed to make it easy to remove and replace the cover or head 8 for cleaning and still be sure of a tight seal. Any non-evaporating oil can be used for the seal or the cover or head may be bolted to the flange 9 at the option of the user of the trap.

The water from the waste line or pipe 15 goes into inner shell 7 which is by-passed to the body 5 through opening 18 and the location of such opening affords a sediment chamber and the water after going through by-pass is forced around outside of shell 7 by the partition 19. The outer body of water within the body 5 has to go beneath the baffle 20 adjacent to the outlet and this traps any grease that gets through the by-pass opening 18. The body of water about the shell 7 and within the body 5 acts as a cooling element for the inner shell 7.

It should be obvious that the trap can be readily cleaned and is easily accessible with dispatch, particularly in the manner stated of the mounting or hanging thereof.

What is claimed is:—

A trap of the kind described comprising a cylindrical body permanently closed at its bottom and open at its top, a hollow shell internally of said body and joined with the bottom thereof, said shell rising from the bottom in close proximity to the open top of said body, an annular oil sealing trough at the open top of the body, a cover fitted on the open top of the body and having a rib extended into the trough, an oil filling the trough and having the rib merged therein, an inlet coupling formed with the shell near the upper end thereof and extended through the body, a waste line fitted in said coupling, an outlet nipple on the body diametrically opposite the coupling, an outlet pipe of a drain line engaged in said nipple, said shell being formed with an opening close to the bottom of the body, and vertical webs arranged between the shell and body and disposed on opposite sides of the outlet nipple, one of the webs being coextensive with the shell while the other web terminates removed from the closed bottom of the body.

ELMER J. MARKING.